United States Patent
McDaniel et al.

(10) Patent No.: US 6,376,415 B1
(45) Date of Patent: *Apr. 23, 2002

(54) ORGANOMETAL CATALYST COMPOSITIONS

(75) Inventors: Max P. McDaniel; James B. Kimble; Kathy S. Collins; Elizabeth A. Benham; Michael D. Jensen, all of Bartlesville; Gil R. Hawley, Dewey; Joel L. Martin, Bartlesville, all of OK (US)

(73) Assignee: Phillips Petroleum Company, Bartlesville, OK (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/407,719

(22) Filed: Sep. 28, 1999

(51) Int. Cl.$^7$ .............................. B01J 31/22; B01J 31/34

(52) U.S. Cl. ..................... 502/113; 502/104; 502/107; 502/120; 502/154

(58) Field of Search ................................. 502/104, 107, 502/113, 120, 154

(56) References Cited

U.S. PATENT DOCUMENTS

| | | | | |
|---|---|---|---|---|
| 4,504,681 A | | 3/1985 | Armor | 564/267 |
| 5,750,813 A | | 5/1998 | Hess et al. | 585/12 |
| 5,861,352 A | * | 1/1999 | Gila et al. | 502/155 |
| 6,107,230 A | * | 8/2000 | McDaniel et al. | 502/104 |

* cited by examiner

*Primary Examiner*—David W. Wu
*Assistant Examiner*—Caixia Lu
(74) *Attorney, Agent, or Firm*—Polly C. Owen

(57) ABSTRACT

This invention provides catalyst compositions that are useful for polymerizing at least one monomer to produce a polymer. This invention also provides catalyst compositions that are useful for polymerizing at least one monomer to produce said polymer, wherein said catalyst composition comprises a post-contacted organometal compound, a post-contacted organoaluminum compound, and a post-contacted treated solid oxide compound.

35 Claims, No Drawings

ORGANOMETAL CATALYST COMPOSITIONS

FIELD OF THE INVENTION

This invention is related to the field of organometal catalyst compositions.

BACKGROUND OF THE INVENTION

The production of polymers is a multi-billion dollar business. This business produces billions of pounds of polymers each year. Millions of dollars have been spent on developing technologies that can add value to this business.

One of these technologies is called metallocene catalyst technology. Metallocene catalysts have been known since about 1960. However, their low productivity did not allow them to be commercialized. About 1975, it was discovered that contacting one part water with one part trimethylaluminum to form methyl aluminoxane, and then contacting such methyl aluminoxane with a metallocene compound, formed a metallocene catalyst that had greater activity. However, it was soon realized that large amounts of expensive methyl aluminoxane were needed to form an active metallocene catalyst. This has been a significant impediment to the commercialization of metallocene catalysts.

Borate compounds have been used in place of large amounts of methyl aluminoxane. However, this is not satisfactory, since borate compounds are very sensitive to poisons and decomposition, and can also be very expensive.

It should also be noted that having a heterogeneous catalyst is important. This is because heterogeneous catalysts are required for most modern commercial polymerization processes. Furthermore, heterogeneous catalysts can lead to the formation of substantially uniform polymer particles that have a high bulk density. These types of substantially uniformed particles are desirable because they improve the efficiency of polymer production and transportation. Efforts have been made to produce heterogeneous metallocene catalysts; however, these catalysts have not been entirely satisfactory.

Therefore, the inventors provide this invention to help solve these problems.

SUMMARY OF THE INVENTION

An object of this invention is to provide a process that produces a catalyst composition that can be used to polymerize at least one monomer to produce a polymer.

Another object of this invention is to provide the catalyst composition.

Another object of this invention is to provide a process comprising contacting at least one monomer and the catalyst composition under polymerization conditions to produce a polymer.

Another object of this invention is to provide an article that comprises the polymer produced with the catalyst composition of this invention.

In accordance with one embodiment of this invention, a process to produce a catalyst composition is provided. The process comprises (or optionally, "consists essentially of", or "consists of") contacting an organometal compound, an organoaluminum compound, and a treated solid oxide compound to produce the catalyst composition, wherein the organometal compound has the following general formula:

$$(X^1)(X^2)(X^3)(X^4)M^1$$

wherein $M^1$ is selected from the group consisting of titanium, zirconium, and hafnium;

wherein $(X^1)$ is independently selected from the group consisting of cyclopentadienyls, indenyls, fluorenyls, substituted cyclopentadienyls, substituted indenyls, and substituted fluorenyls;

wherein substituents on the substituted cyclopentadienyls, substituted indenyls, and substituted fluorenyls of $(X^1)$ are selected from the group consisting of aliphatic groups, cyclic groups, combinations of aliphatic and cyclic groups, silyl groups, alkyl halide groups, halides, organometallic groups, phosphorus groups, nitrogen groups, boron groups, and germanium groups;

wherein at least one substituent on $(X^1)$ can be a bridging group which connects $(X^1)$ and $(X^2)$;

wherein $(X^3)$ and $(X^4)$ are independently selected from the group consisting of halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups;

wherein $(X^2)$ is selected from the group consisting of cyclopentadienyls, indenyls, fluorenyls, substituted cyclopentadienyls, substituted indenyls, substituted fluorenyls, halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups;

wherein substituents on $(X^2)$ are selected from the group consisting of aliphatic groups, cyclic groups, combinations of aliphatic groups and cyclic groups, silyl groups, alkyl halide groups, halides, organometallic groups, phosphorus groups, nitrogen groups, boron groups, and germanium groups;

wherein at least one substituent on $(X^2)$ can be a bridging group which connects $(X^1)$ and $(X^2)$;

wherein the organoaluminun compound has the following general formula:

$$Al(X^5)_n(X^6)_{3-n}$$

wherein $(X^5)$ is a hydrocarbyl having from 1–20 carbon atoms;
wherein $(X^6)$ is a halide, hydride, or alkoxide;
wherein "n" is a number from 1 to 3 inclusive; and
wherein the treated solid oxide compound comprises a halogen, a transition metal, and a solid oxide compound;
wherein the halogen is selected from the group consisting of chloride and bromide;

wherein the transition metal is selected from the group consisting of tungsten and molybdenum;

wherein the solid oxide compound is selected from the group consisting of alumina, aluminophosphate, aluminosilicate, and mixtures thereof.

In accordance with another embodiment of this invention, a process is provided comprising contacting at least one monomer and the catalyst composition under polymerization condition to produce a polymer.

In accordance with another embodiment of this invention, an article is provided. The article comprises the polymer produced in accordance with this invention.

These objects, and other objects, will become more apparent to those with ordinary skill in the art after reading this disclosure.

DETAILED DESCRIPTION OF THE INVENTION

Organometal compounds used in this invention have the following general formula:

$(X^1)(X^2)(X^3)(X^4)M^1$

In this formula, $M^1$ is selected from the group consisting of titanium, zirconium, and hafnium. Currently, it is most preferred when $M^1$ is zirconium.

In this formula, $(X^1)$ is independently selected from the group consisting of (hereafter "Group OMC-I") cyclopentadienyls, indenyls, fluorenyls, substituted cyclopentadienyls, substituted indenyls, such as, for example, tetrahydroindenyls, and substituted fluorenyls, such as, for example, octahydrofluorenyls.

Substituents on the substituted cyclopentadienyls, substituted indenyls, and substituted fluorenyls of $(X^1)$ can be selected independently from the group consisting of aliphatic groups, cyclic groups, combinations of aliphatic and cyclic groups, silyl groups, alkyl halide groups, halides, organometallic groups, phosphorus groups, nitrogen groups, silicon, phosphorus, boron, germanium, and hydrogen, as long as these groups do not substantially, and adversely, affect the polymerization activity of the catalyst composition.

Suitable examples of aliphatic groups are hydrocarbyls, such as, for example, paraffins and olefins. Suitable examples of cyclic groups are cycloparaffins, cycloolefins, cycloacetylenes, and arenes. Substituted silyl groups include, but are not limited to, alkylsilyl groups where each alkyl group contains from 1 to about 12 carbon atoms, arylsilyl groups, and arylalkylsilyl groups. Suitable alkyl halide groups have alkyl groups with 1 to about 12 carbon atoms. Suitable organometallic groups include, but are not limited to, substituted silyl derivatives, substituted tin groups, substituted germanium groups, and substituted boron groups.

Suitable examples of such substituents are methyl, ethyl, propyl, butyl, tert-butyl, isobutyl, amyl, isoamyl, hexyl, cyclohexyl, heptyl, octyl, nonyl, decyl, dodecyl, 2-ethylhexyl, pentenyl, butenyl, phenyl, chloro, bromo, iodo, trimethylsilyl, and phenyloctylsilyl.

In this formula, $(X^3)$ and $(X^4)$ are independently selected from the group consisting of (hereafter "Group OMC-II") halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups, as long as these groups do not substantially, and adversely, affect the polymerization activity of the catalyst composition.

Suitable examples of aliphatic groups are hydrocarbyls, such as, for example, paraffins and olefins. Suitable examples of cyclic groups are cycloparaffins, cycloolefins, cycloacetylenes, and arenes. Currently, it is preferred when $(X^3)$ and $(X^4)$ are selected from the group consisting of halides and hydrocarbyls, where such hydrocarbyls have from 1 to about 10 carbon atoms. However, it is most preferred when $(X^3)$ and $(X^4)$ are selected from the group consisting of fluoro, chloro, and methyl.

In this formula, $(X^2)$ can be selected from either Group OMC-I or Group OMC-II.

At least one substituent on $(X^1)$ or $(X^2)$ can be a bridging group that connects $(X^1)$ and $(X^2)$, as long as the bridging group does not substantially, and adversely, affect the activity of the catalyst composition. Suitable bridging groups include, but are not limited to, aliphatic groups, cyclic groups, combinations of aliphatic groups and cyclic groups, phosphorous groups, nitrogen groups, organometallic groups, silicon, phosphorus, boron, and germanium.

Suitable examples of aliphatic groups are hydrocarbyls, such as, for example, paraffins and olefins. Suitable examples of cyclic groups are cycloparaffins, cycloolefins, cycloacetylenes, and arenes. Suitable organometallic groups include, but are not limited to, substituted silyl derivatives, substituted tin groups, substituted germanium groups, and substituted boron groups.

Various processes are known to make these organometal compounds. See, for example, U.S. Pat. Nos. 4,939,217; 5,210,352; 5,436,305; 5,401,817; 5,631,335; 5,571,880; 5,191,132; 5,480,848; 5,399,636; 5,565,592; 5,347,026; 5,594,078; 5,498,581; 5,496,781; 5,563,284; 5,554,795; 5,420,320; 5,451,649; 5,541,272; 5,705,478; 5,631,203; 5,654,454; 5,705,579; and 5,668,230; the entire disclosures of which are hereby incorporated by reference.

Specific examples of such organometal compounds are as follows:

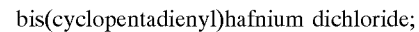

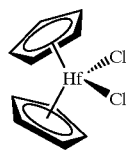

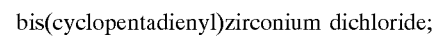

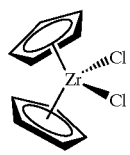

1,2-ethanediylbis($\eta^5$-1-indenyl)di-n-butoxyhafnium;

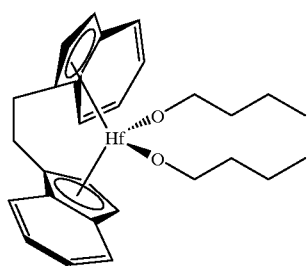

1,2-ethanediylbis($\eta^5$-1-indenyl)dimethylzirconium;

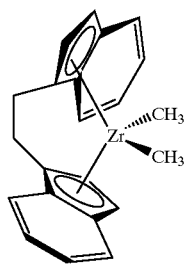

3,3-pentanediylbis($\eta^5$-4,5,6,7-tetrahydro-1-indenyl) hafnium dichloride;

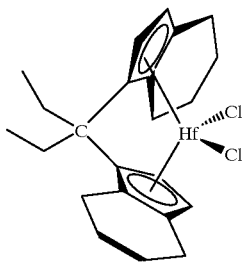

methylphenylsilylbis($\eta^5$-4,5,6,7-tetrahydro-1-indenyl) zirconium dichloride;

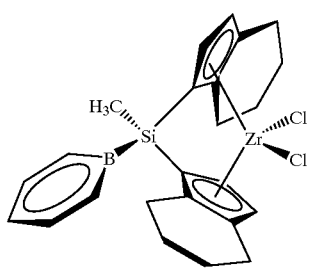

"bis(n-butylcyclopentadienyl)di-t-butylamidohafnium";

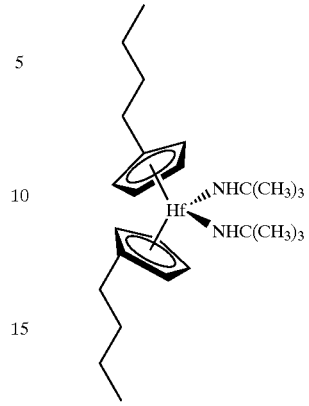

bis(n-butylcyclopentadienyl)zirconium dichloride;

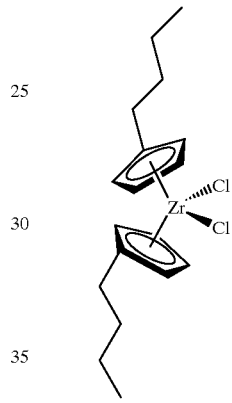

dimethylsilylbis(1-indenyl)zirconium dichloride;

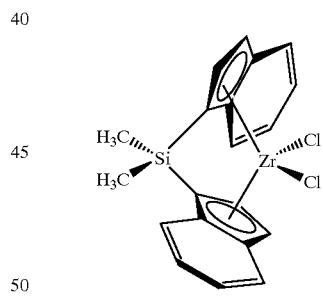

"nonyl(phenyl)silylbis(1-indenyl)hafnium dichloride";

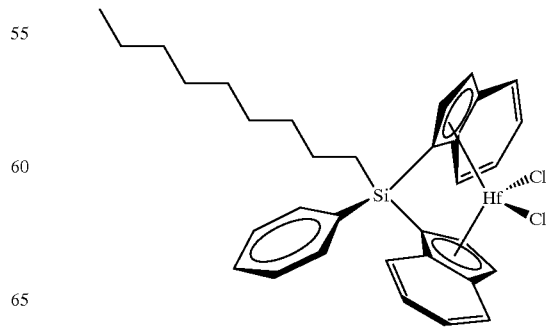

dimethylsilylbis($\eta^5$-4,5,6,7-tetrahydro-1-indenyl) zirconium dichloride;

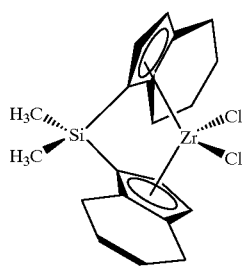

dimetiylsilylbis(2-methyl-1-indenyl)zirconium dichloride;

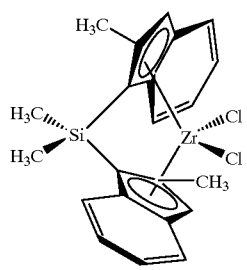

1,2-ethanediylbis(9-fluorenyl)zirconium dichloride;

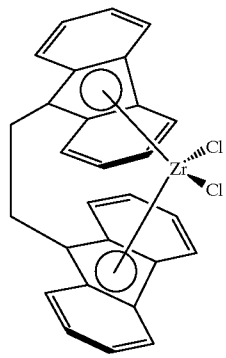

indenyl diethoxy titanium(IV) chloride;

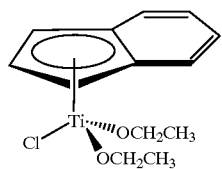

(isopropylamidodimethylsilyl)cyclopentadienyltitanium dichloride;

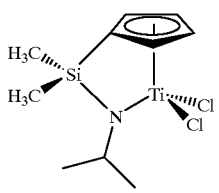

bis(pentamethylcyclopentadienyl)zirconium dichloride;

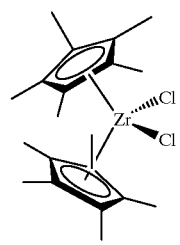

bis(indenyl) zirconium dichloride;

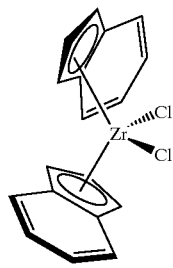

methyloctylsilyl bis (9-fluorenyl) zirconium dichloride;

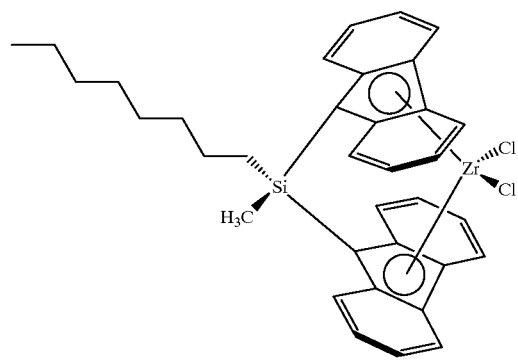

bis-[1-(N,N-diisopropylamino)boratabenzene] hydridozirconium trifluoromethylsulfonate

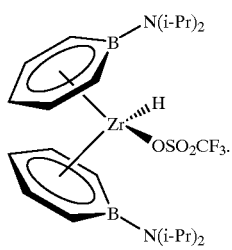

Preferably, the organometal compound is selected from the group consisting of bis(n-butylcyclopentadienyl)zirconium dichloride;

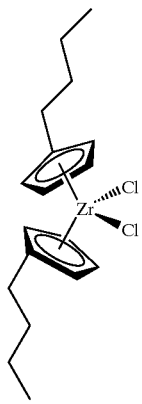

bis(indenyl)zirconium dichloride;

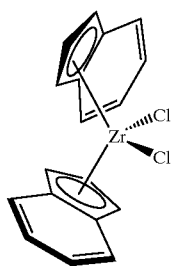

dimethylsilylbis(1-indenyl) zirconium dichloride;

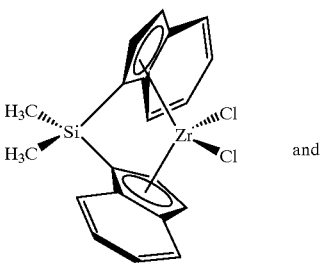 and methyloctylsilylbis(9-fluorenyl)zirconium dichloride

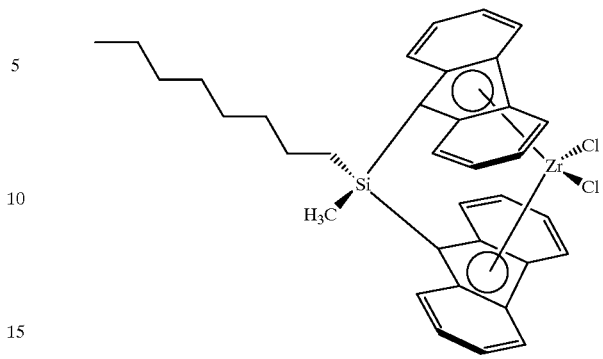

Organoaluminum compounds have the following general formula:

$$Al(X^5)_n(X^6)_{3-n}$$

In this formula, $(X^5)$ is a hydrocarbyl having from 1 to about 20 carbon atoms. Currently, it is preferred when $(X^5)$ is an alkyl having from 1 to about 10 carbon atoms. However, it is most preferred when $(X^5)$ is selected from the group consisting of methyl, ethyl, propyl, butyl, and isobutyl.

In this formula, $(X^6)$ is a halide, hydride, or alkoxide. Currently, it is preferred when $(X^6)$ is independently selected from the group consisting of fluoro and chloro. However, it is most preferred when $(X^6)$ is chloro.

In this formula, "n" is a number from 1 to 3 inclusive. However, it is preferred when "n" is 3.

Examples of such compounds are as follows:

trimethylaluminum;
triethylaluminum (TEA);
tripropylaluminum;
diethylaluminum ethoxide;
tributylaluminum;
diisobutylaluminum hydride;
triisobutylaluminum hydride;
triisobutylaluminum; and
diethylaluminum chloride. Currently, TEA is preferred.

The treated solid oxide compound comprises a halogen, a transition metal, and a solid oxide compound. The halogen is selected from the group consisting of chloride and bromide. The transition metal is selected from the group consisting of tungsten and molybdenum. The solid oxide compound is selected from the group consisting of alumina, or aluminophosphate, aluminosilicate, and mixtures thereof. Preferably, the solid oxide compound is alumina.

The solid oxide compound should have a pore volume greater than about 0.5 cc/g, preferably greater than about 0.8 cc/g, and most preferably, greater than 1.0 cc/g.

The solid oxide compound should have a surface area in a range of about 100 to about 1000 m²/g, preferably from about 250 to about 800 m²/g, and most preferably, from 250 to 600 m²/g.

To produce the treated solid oxide compound, the solid oxide compound is contacted with a transition metal-containing compound, in order to add the transition metal to the solid oxide compound. The transition metal can be added to the solid oxide compound by any method known in the art. Generally, an aqueous or organic solution of a transition metal-containing compound can be used to impregnate the solid oxide compound prior to calcining to produce a transition metal-containing solid oxide compound. A suitable amount of the solution is utilized to provide the desired concentration of the transition metal after drying. The transition metal-containing solid oxide compound is then dried by any suitable method known in the art. For example, the drying can be accomplished by vacuum drying, spray drying, or flash drying.

Any tungsten-containing compound or molybdenum-containing compound known in the art that can impregnate the solid oxide compound can serve as the transition-metal containing compound. Generally, the transition metal-containing compound can be any tungsten or molybdenum salt calcinable to an oxide. The transition metal-containing compound can be selected from the group consisting of ammonium metatungstate, ammonium tungstate, sodium metamolybdate, molybdic acid, tungsten hexacarbonyl, molybdenum hexacarbonyl, molybdenum pentachloride, molybdenum dioxide, molybdenum trioxide, tungsten trioxide, tungstic acid, tungsten hexachloride, and mixtures thereof.

Generally, the amount of transition metal present is in the range of about 0.01 to about 10 millimoles per gram of solid oxide compound before calcining. Preferably the amount of transition metal present is in the range of about 0.1 to about 5 millimoles per gram of solid oxide compound before calcining. Most preferably, the amount of transition metal present is in the range of 0.5 to 2.0 millimoles per gram of solid oxide compound before calcining.

After the solid oxide compound is combined with the transition metal-containing compound to produce a transition metal-containing solid oxide compound, it is then calcined for about 1 minute to about 100 hours, preferably for about 1 hour to about 50 hours, and most preferably, from 3 hours to 20 hours. The calcining is conducted at a temperature in a range of about 200 to about 900° C., preferably, in a range of about 300 to about 800° C., and most preferably, in a range of 400 to 700° C. Any type of suitable atmosphere can be used during calcining. Generally, calcining can be completed in an inert atmosphere. Alternatively, an oxidizing atmosphere, such as, for example, oxygen or air, or a reducing atmosphere, such as, for example, hydrogen or carbon monoxide, can be used.

After or during calcining, the transition metal-containing solid oxide compound is contacted with a halogen-containing compound to produce the treated solid oxide compound. The halogen-containing compound can be in a liquid or preferably, a vapor phase. The transition metal-containing solid oxide compound can be contacted with the halogen-containing compound by any means known in the art. Preferably, the halogen-containing compound can be vaporized into a gas stream used to fluidize the solid oxide compound during calcining. The transition metal-containing solid oxide compound is contacted with the halogen-containing compound generally from about 1 minute to about 10 hours, preferably, from about 5 minutes to about 1 hour, and most preferably, from 10 minutes to 30 minutes. Generally, the transition metal-containing solid oxide compound is in contact with the halogen-containing compound at a temperature in the range of about 200 to about 900° C., preferably, at a temperature in a range of about 300 to about 800° C., and most preferably, in a range of 400 to 700° C. Any type of suitable atmosphere can be used to contact the transition metal-containing solid oxide compound and the halogen-containing compound. Preferably, an inert atmosphere is used. Alternatively, an oxidizing or reducing atmosphere can also be used.

Any suitable chloride-containing compound or bromide-containing compound can serve as the halogen-containing compound. Suitable chloride-containing compounds or bromide-containing compounds include, but are not limited to, volatile or liquid organic compounds containing chloride or bromide and inorganic compounds containing chloride or bromide. Organic compounds containing chloride or bromide can be selected from the group consisting of carbon tetrachloride, chloroform, dichloroethane, hexachlorobenzene, trichloroacetic acid, bromoform, dibromomethane, perbromopropane, and mixtures thereof. Inorganic compounds containing chloride or bromide can be selected from the group consisting of gaseous hydrogen chloride, silicon tetrachloride, tin tetrachloride, titanium tetrachloride, aluminum trichloride, boron trichloride, thionyl chloride, sulfuryl chloride, hydrogen bromide, bromine, boron tribromide, silicon tetrabromide, and mixtures thereof. Optionally, fluoride can also be included when contacting the transition metal-containing solid oxide compound with the chloride-containing compound or bromide-containing compound to achieve higher activity in some cases.

The amount of the chloride or bromide present before calcining is generally in the range of about 2 to about 50% by weight, preferably about 3 to about 25% by weight, and most preferably, 4 to 20% by weight, where the weight percents are based on the weight of the treated solid oxide compound before calcining.

The catalyst compositions of this invention can be produced by contacting the organometal compound, the treated solid oxide compound, and the organoaluminum compound, together. This contacting can occur in a variety of ways, such as, for example, blending. Furthermore, each of these compounds can be fed into the reactor separately, or various combinations of these compounds can be contacted together before being further contacted in the reactor, or all three compounds can be contacted together before being introduced into the reactor.

Currently, one method is to first contact an organometal compound and a treated solid oxide compound together, for about 1 minute to about 24 hours, preferably, about 1 minute to about 1 hour, at a temperature from about 10° C. to about 100° C., preferably 15° C. to 50° C., to form a first mixture, and then contact this first mixture with an organoaluminum compound to form the catalyst composition.

Another method is to precontact the organometal compound, the organoaluminum compound, and the treated solid oxide compound before injection into a polymerization reactor for about 1 minute to about 24 hours, preferably, 1 minute to 1 hour, at a temperature from about 10° C. to about 200° C., preferably 20° C. to 80° C.

A weight ratio of the organoaluminum compound to the treated solid oxide compound in the catalyst composition ranges from about 5:1 to about 1:1000, preferably, from about 3:1 to about 1:100, and most preferably, from 1:1 to 1:50.

A weight ratio of the treated solid oxide compound to the organometal compound in the catalyst composition ranges from about 10,000:1 to about 1:1, preferably, from about 1000:1 to about 10:1, and most preferably, from 250:1 to 20:1. These ratios are based on the amount of the components combined to give the catalyst composition.

After contacting, the catalyst composition comprises a post-contacted organometal compound, a post-contacted organoaluminum compound, and a post-contacted treated solid oxide compound. It should be noted that the post-contacted treated solid oxide compound is the majority, by weight, of the catalyst composition. Often times, specific components of a catalyst are not known, therefore, for this invention, the catalyst composition is described as comprising post-contacted compounds.

A weight ratio of the post-contacted organoaluminum compound to the post-contacted treated solid oxide compound in the catalyst composition ranges from about 5:1 to about 1:1000, preferably, from about 3:1 to about 1:100, and most preferably, from 1:1 to 1:50.

A weight ratio of the post-contacted treated solid oxide compound to the post-contacted organometal compound in the catalyst composition ranges from about 10,000:1 to about 1:1, preferably, from about 1000:1 to about 10:1, and most preferably, from 250:1 to 20:1.

The catalyst composition of this invention has an activity greater than a catalyst composition that uses the same organometal compound, and the same organoaluminum compound, but uses alumina, silica, or a chlorided alumina that has not been impregnated with tungsten or molybdenum as an activator for the organometal compound as shown in comparative examples 1–3.

Furthermore, the catalyst composition of this invention has an activity greater than a catalyst composition that uses the same organometal compound, and the same organoaluminum compound, but uses a tungsten-containing alumina as an activator, without contacting with a halogen-containing compound, as shown in comparative example 4. This activity is measured under slurry polymerization conditions, using isobutane as the diluent, and with a polymerization temperature of about 50 to about 110° C., and an ethylene pressure of about 400 to about 800 psig. When comparing activities, the polymerization should occur at the same polymerization conditions. The reactor should have substantially no indication of any wall scale, coating or other forms of fouling.

However, it is preferred if the activity is greater than about 1000 grams of polymer per gram of treated solid oxide compound per hour, more w preferably greater than about 2000, and most preferably greater than 3000. This activity is measured under slurry polymerization conditions, using isobutane as the diluent, and with a polymerization temperature of 90° C., and an ethylene pressure of 550 psig. The reactor should have substantially no indication of any wall scale, coating or other forms of fouling.

One of the important aspects of this invention is that no aluminoxane needs to be used in order to form the catalyst composition. Aluminoxane is an expensive compound that greatly increases polymer production costs. This also means that no water is needed to help form such aluminoxanes. This is beneficial because water can sometimes kill a polymerization process. Additionally, it should be noted that no borate compounds need to be used in order to form the catalyst composition. In summary, this means that the catalyst composition, which is heterogenous, and which can be used for polymerizing monomers, can be easily and inexpensively produced because of the substantial absence of any aluminoxane compounds or borate compounds. Additionally, no organochromium needs to be added, nor any $MgCl_2$ needs to be added to form the invention. Although aluminoxane, borate compounds, organochromium compounds, or $MgCl_2$ are not needed in the preferred embodiments, these compounds can be used in other embodiments of this invention.

In another embodiment of this invention, a process comprising contacting at least one monomer and the catalyst composition to produce a polymer is provided. The term "polymer" as used in this disclosure includes homopolymers and copolymers. The catalyst composition can be used to polymerize at least one monomer to produce a homopolymer or a copolymer. Usually, homopolymers are comprised of monomer residues, having 2 to about 20 carbon atoms per molecule, preferably 2 to about 10 carbon atoms per molecule. Currently, it is preferred when at least one monomer is selected from the group consisting of ethylene, propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, and mixtures thereof.

When a homopolymer is desired, it is most preferred to polymerize ethylene or propylene. When a copolymer is desired, the copolymer comprises monomer residues and one or more comonomer residues, each having from about 2 to about 20 carbon atoms per molecule. Suitable comonomers include, but are not limited to, aliphatic 1-olefins having from 3 to 20 carbon atoms per molecule, such as, for example, propylene, 1-butene, 1-pentene, 4-methyl-1-pentene, 1-hexene, 1-octene, and other olefins and conjugated or nonconjugated diolefins such as 1,3-butadiene, isoprene, piperylene, 2,3-dimethyl-1,3-butadiene, 1,4-pentadiene, 1,7-hexadiene, and other such diolefins and mixtures thereof. When a copolymer is desired, it is preferred to polymerize ethylene and at least one comonomer selected from the group consisting of 1-butene, 1-pentene, 1-hexene, 1-octene, and 1-decene. The amount of comonomer introduced into a reactor zone to produce a copolymer is generally from about 0.01 to about 10 weight percent comonomer based on the total weight of the monomer and comonomer, preferably, about 0.01 to about 5, and most preferably, 0.1 to 4. Alternatively, an amount sufficient to give the above described concentrations, by weight, in the copolymer produced can be used.

Processes that can polymerize at least one monomer to produce a polymer are known in the art, such as, for example, slurry polymerization, gas phase polymerization, and solution polymerization. It is preferred to perform a slurry polymerization in a loop reaction zone. Suitable diluents used in slurry polymerization are well known in the art and include hydrocarbons which are liquid under reaction conditions. The term "diluent" as used in this disclosure does not necessarily mean an inert material; it is possible that a diluent can contribute to polymerization. Suitable hydrocarbons include, but are not limited to, cyclohexane, isobutane, n-butane, propane, n-pentane, isopentane, neopentane, and n-hexane. Furthermore, it is most preferred to use isobutane as the diluent in a slurry polymerization. Examples of such technology can be found in U.S. Pat. Nos. 4,424,341; 4,501,885; 4,613,484; 4,737,280; and 5,597,892; the entire disclosures of which are hereby incorporated by reference.

The catalyst compositions used in this process produce good quality polymer particles without substantially fouling the reactor. When the catalyst composition is to be used in a loop reactor zone under slurry polymerization conditions, it is preferred when the particle size of the solid oxide compound is in the range of about 10 to about 1000 microns, preferably about 25 to about 500 microns, and most preferably, 50 to 200 microns, for best control during polymerization.

In a more specific embodiment of this invention, a process is provided to produce a catalyst composition, the process comprising (optionally, "consisting essentially of", or "consisting of"):

(1) contacting alumina with an aqueous solution containing ammonium metatungstate to produce a tungsten-containing alumina having from 0.5 to 2.0 millimoles of tungsten per gram of alumina before calcining;

(2) calcining the tungsten-containing alumina at a temperature within a range of 400 to 700° C. for 3 to 20 hours to produce a calcined composition;

(3) contacting the calcined composition with carbon tetrachloride for 10 minutes to 30 minutes to produce a chlorided, tungsten-containing alumina;

(4) combining the chlorided, tungsten-containing alumina and bis(n-butylcyclopentadienyl) zirconium dichloride at a temperature within the range of 15° C. to 80° C. to produce a mixture; and (5) after between 1 minute and 1 hour, combining the mixture and triethylaluminum to produce the catalyst composition.

Hydrogen can be used with this invention in a polymerization process to control polymer molecular weight.

After the polymers are produced, they can be formed into various articles, such as, for example, household containers and utensils, film products, drums, fuel tanks, pipes, geomembranes, and liners. Various processes can form these articles. Usually, additives and modifiers are added to the polymer in order to provide desired effects. It is believed that by using the invention described herein, articles can be produced at a lower cost, while maintaining most, if not all, of the unique properties of polymers produced with metallocene catalysts.

EXAMPLES

Preparation of Oxide Compounds

Oxide compounds, such as silica and alumina, and the inventive treated solid oxide compounds were prepared according to the following procedures.

Silica

Silica was obtained from W. R.Grace, grade 952, having a pore volume of about 1.6 cc/g and a surface area of about 300 m$^2$g. About 10 grams of the silica were placed in a 1.75 inch quartz tube fitted with a sintered quartz disk at the bottom. While the silica was supported on the disk, dry air was blown up through the disk at the linear rate of about 1.6 to 1.8 standard cubic feet per hour. An electric furnace around the quartz tube was then turned on, and the temperature was raised at the rate of 400° C. per hour to a temperature of 600° C. At this temperature, the silica was allowed to fluidize for three hours in the dry air. Afterward, the silica was collected and stored under dry nitrogen and did not have any exposure to the atmosphere.

Alumina

Alumina sold by Akzo Nobel as Ketjen grade B alumina was obtained having a pore volume of about 1.78 cc/g and a surface area of about 340 square meters per gram. Ten grams of this alumina were calcined at 600° C. by the procedure described previously for the silica.

Chlorided Alumina

Ten grams of alumina were calcined in air for three hours at 600° C. as described above. After this calcining step, the temperature was maintained at 600° C., and the gas stream changed from air to dry nitrogen. Then, 2.3 milliliters of carbon tetrachloride were injected into the nitrogen stream and evaporated upstream from the alumina bed. Carbon tetrachloride vapor was carried up through the bed and reacted with the alumina to produce a chlorided alumina. After this treatment, the chlorided alumina was white in color.

Tungsten-Containing Alumina

Fifty grams of the Ketjen grade B alumina obtained from Akzo Nobel were impregnated with 100 milliliters of an aqueous solution containing 10 grams of ammonium metatungstate to produce a tungsten-containing alumina. A sufficient amount of the aqueous solution was added to reach a point of incipient wetness producing a wet sand consistency. The tungsten-containing alumina was then dried overnight in a vacuum oven at half an atmosphere of vacuum at 110° C. Then, it was pushed through a 35 mesh screen. Ten grams of the tungsten-containing alumina were then calcined in air at 600° C. by the procedures described previously.

Chlorided. Tungsten-Containing Alumina

Ten grams of the tungsten-containing alumina prepared as disclosed previously were calcined in dry air at 600° C. After this calcining step, the temperature was maintained at 600° C., and the gas stream changed from air to dry nitrogen. Then, 2.3 milliliters of carbon tetrachloride were injected into the nitrogen stream and evaporated upstream from the tungsten-containing alumina bed. The carbon tetrachloride vapor was carried up through the bed and reacted with the tungsten-containing alumina to produce a chlorided, tungsten-containing alumina. After this treatment, the chlorided, tungsten-containing alumina was white in color.

Molybdenum-Containing Silica

A sample of Davison grade 952 silica was impregnated with an aqueous solution containing 12.5 grams of phosphomolybdic acid ($H_3PO_4:12MoO_3$) in 100 milliliters of water to produce a molybdenum-containing silica. A sufficient amount of the aqueous solution was added to reach a point of incipient wetness producing a wet sand consistency. The molybdenum-containing silica was then dried overnight in a vacuum oven at half an atmosphere of vacuum at 110° C. Then, it was pushed through a 35 mesh screen. Ten grams of the molybdenum-containing silica were then calcined in air at 600° C. by the procedures described above.

Chlorided. Molybdenum-Containing Alumina 34.88 grams of Ketjen grade B alumina was impregnated with 70 milliliters of an aqueous solution containing 7 grams of ammonium molybdate $((NH_4)_6Mo_7O_{24}:4H_2O)$ to produce a molybdenum-containing alumina. A sufficient amount of the aqueous solution was added to reach a point of incipient wetness producing a wet sand consistency. The molybdenum-containing alumina was then dried overnight in a vacuum oven at half an atmosphere of vacuum at 110° C. Then, it was pushed through a 35 mesh screen. Ten grams of the molybdenum-containing alumina were then calcined in air at 600° C. by the procedures described above. Next 2.3 milliliters of carbon tetrachloride were injected into the nitrogen stream and evaporated upstream from the molybdenum-containing alumina bed. The carbon tetrachloride vapor was carried up through the bed and reacted with the molybdenum-containing alumina to produce a chlorided, molybdenum-containing alumina. After this treatment, the molybdenum-containing alumina was blue in color.

Fluorided, Tungsten-Containing Alumina 15.19 grams of the uncalcined tungsten-containing alumina prepared previously was placed in the quartz tube as described above and calcined at 600° C. in dry air for three hours. Then, 2.2 milliliters of perfluorohexane were injected into the gas stream in order to fluoride the tungsten-containing alumina to produce a fluorided, tungsten-containing alumina. After all of the perfluorohexane had evaporated, the fluorided, tungsten-containing alumina was flushed with nitrogen and cooled to room temperature, where it was stored under dry nitrogen.

Description of Polymerizations Runs

Polymerization runs were made in a 2.2 liter steel reactor equipped with a marine stirrer running at 400 revolutions per minute (rpm). The reactor was surrounded by a steel jacket containing boiling methanol with a connection to a steel condenser. The boiling point of the methanol was controlled by varying nitrogen pressure applied to the condenser and jacket, which permitted precise temperature control to within half a degree centigrade, with the help of electronic control instruments.

Unless otherwise stated, first, a small amount (0.1 to 1.0 grams) of an oxide compound or the inventive treated solid oxide compound was charged under nitrogen to a dry reactor. Next, two milliliters of an organometal compound solution were added by syringe containing 0.5 grams of bis(n-butlycyclopentadienyl) zirconium dichloride per 100 milliliters of toluene. Then, 1.2 liters of isobutane liquid was charged, and the reactor brought up to 90° C. One milliliter, or two milliliters, of TEA as a 15 weight % (1molar) solution in heptane was added midway during the isobutane addition. Finally, ethylene was added to the reactor to equal 550 psig pressure which was maintained during the experiment. The stirring was allowed to continue for the specified time, and the activity was noted by recording the flow of ethylene into the reactor to maintain pressure.

After the allotted time, usually about one hour, the ethylene flow was stopped, and the reactor slowly depressurized and opened to recover a granular polymer. In all cases, the reactor was clean with no indication of any wall scale, coating or other forms of fouling. The polymer was removed and weighed. Activity was specified as grams of polymer produced per gram of oxide compound or treated solid oxide compound charged per hour.

Table 1 shows the results obtained from testing the oxide compounds or the treated solid oxide compound prepared as described previously in these examples in polymerization runs to determine the activity of each. As can be seen in the results in Table 1, the silica, alumina, tungsten-containing alumina, molybdenum-containing silica, and fluorided, tungsten-containing alumina provided only marginal activity. The chlorided alumina, however, did provide respectable activity, indicating that it is capable of of reacting with the organometal compound to activate it. However, adding tungsten to the chlorided alumina doubled the activity achieved from the chlorided alumina.

TABLE 1

Polymerization Results

| Example | Test Compound* | Calcining Temp. (° C.) | Amount of Test Compound (g) | Organo-aluminum Compound | Polymer (g) | Run Time (min) | Activity* (g/g/h) |
|---|---|---|---|---|---|---|---|
| 1-Control | Silica | 600 | 0.5686 | 2 mls 1 M TEA | 0.65 | 63.0 | 1 |
| 2-Control | Alumina | 600 | 0.2361 | 2 mls IM TEA | 6.9 | 60.9 | 29 |
| 3-Control | Chlorided Alumina | 600 | 0.2058 | 2 mls 1 M TEA | 351.5 | 63.0 | 1627 |
| 4-Control | Tungsten-Containing Alumina | 800 | 0.0320 | 1 ml 1M TEA | 106.9 | 61.0 | 11 |
| 5-Invention | Chlorided, Tungsten-Containing Alumina | 600 | 1.1219 | 1 ml 1M TEA | 21.5 | 104.5 | 3286 |
| 6-Control | Molybdenum-Containing Silica | 600 | 0.2284 | 1 ml 1M TEA | 2.0 | 46.0 | 11 |
| 7-Invention | Chlorided, Molybdenum-Containing Alumina | 600 | 0.0164 | 1 ml 1M TEA | 74.0 | 60.0 | 4512 |
| 8-Control | Fluorided, Tungsten-Containing Alumina | 600 | 0.4419 | 1 ml 1M TEA | 11.9 | 60.1 | 27 |

Polymerization at 90° C., 550 psig, 1.2 liters of isobutane for approximately an hour;
Organometal compound = 25 micromoles bis(n-butyl cyclopentadienyl) zirconium dichloride, or 2.3 mg Zr;
Organoaluminum compound = 1 or 2 mls of 5% by weight triethylaluminum in heptane

*Test Compound = oxide compound or treated solid oxide compound;
*Activity = grams of polymer per gram of oxide compound or treated solid oxide compound per hour.

That which is claimed is:

1. A process to produce a catalyst composition, said process comprising contacting at least one organometal compound, at least one organoaluminum compound, and at least one treated solid oxide compound to produce said catalyst composition, wherein said organometal compound has the following general formula:

$$(X^1)(X^2)(X^3)(X^4)M^1$$

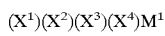

wherein $M^1$ is selected from the group consisting of titanium, zirconium, and hafnium;

wherein $(X^1)$ is independently selected from the group consisting of cyclopentadienyls, indenyls, fluorenyls, substituted cyclopentadienyls, substituted indenyls, and substituted fluorenyls;

wherein substituents on said substituted cyclopentadienyls, substituted indenyls, and substituted fluorenyls of $(X^1)$ are selected from the group consisting of aliphatic groups, cyclic groups, combinations of aliphatic and cyclic groups, silyl groups, alkyl halide groups, halides, organometallic groups, phosphorus groups, nitrogen groups, boron groups, and germanium groups;

wherein at least one substituent on ($X^1$) can be a bridging group which connects ($X^1$) and ($X^2$);

wherein ($X^3$) and ($X^4$) are independently selected from the group consisting of halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups;

wherein ($X^2$) is selected from the group consisting of cyclopentadienyls, indenyls, fluorenyls, substituted cyclopentadienyls, substituted indenyls, substituted fluorenyls, halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups;

wherein substituents on ($X^2$) are selected from the group consisting of aliphatic groups, cyclic groups, combinations of aliphatic groups and cyclic groups, silyl groups, alkyl halide groups, halides, organometallic groups, phosphorus groups, nitrogen groups, boron groups, and germanium groups;

wherein at least one substituent on ($X^2$) can be a bridging group which connects ($X^1$) and ($X^2$);

wherein said organoaluminum compound has the general formula:

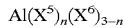

$$Al(X^5)_n(X^6)_{3-n}$$

wherein ($X^5$) is a hydrocarbyl having from 1 to about 20 carbon atoms;

wherein ($X^6$) is a halide, hydride, or alkoxide; and wherein "n" is a number from 1 to 3 inclusive; and wherein said treated solid oxide compound comprises a halogen, molybdenum, and at least one solid oxide compound;

wherein said halogen is selected from the group consisting of chloride and bromide;

wherein said solid oxide compound is selected from the group consisting of alumina, aluminophosphate, aluminosilicate, and mixtures thereof.

2. A process to produce a catalyst composition, said process comprising:

1) contacting an alumina with an aqueous solution containing ammonium molybdate to produce a molybdenum-containing alumina having from 0.5 to 2.0 millimoles of molybdenum per gram of alumina before calcining;

2) calcining said molybdenum-containing alumina at a temperature within a range of 400 to 700° C. for 3 to 20 hours to produce a calcined composition;

3) contacting said calcined composition with carbon tetrachloride for 10 minutes to 30 minutes to produce a chlorided, molybdenum-containing alumina;

4) combining said chlorided, molybdenum-containing alumina and bis(n-butylcyclopentadienyl) zirconium dichloride at a temperature within the range of 15° C. to 80° C. to produce a mixture, and 5) after between 1 minute and 1 hour, combining said mixture and triethylaluminum to produce said catalyst composition.

3. A process according to claim 2 wherein said process consists essentially of steps (1), (2), (3), (4), and (5).

4. A catalyst composition produced by the process of claim 1.

5. A catalyst composition according to claim 4 wherein said catalyst composition has an activity greater than 2000 grams of polymer per gram of treated solid oxide compound per hour under slurry polymerization conditions, using isobutane as a diluent, with a polymerization temperature of 90° C., and an ethylene pressure of 550 psig.

6. A catalyst composition according to claim 5 wherein said catalyst composition has an activity greater than 3000 grams of polymer per gram of treated solid oxide compound per hour under slurry polymerization conditions, using isobutane as a diluent, with a polymerization temperature of 90° C., and an ethylene pressure of 550 psig.

7. A catalyst composition according to claim 5 wherein a weight ratio of said organoaluminum compound to said treated solid oxide compound in said catalyst composition ranges from about 3:1 to about 1:100.

8. A catalyst composition according to claim 7 wherein said weight ratio of said organoaluminum compound to said treated solid oxide compound in said catalyst composition ranges from 1:1 to 1:50.

9. A catalyst composition according to claim 5 wherein a weight ratio of said treated solid oxide compound to said organometal compound in said catalyst composition ranges from about 1000:1 to about 10:1.

10. A catalyst composition according to claim 9 wherein said weight ratio of said treated solid oxide compound to said organometal compound in said catalyst composition ranges from 250:1 to 20:1.

11. A catalyst composition according to claim 10 wherein said treated solid oxide compound comprises alumina, 0.5 to 2.0 millimoles of molybdenum per gram of said alumina before calcining, from 4 to 20% by weight chloride based on the weight of said alumina before calcining, and is calcined for 3 to 20 hours at a temperature from 400 to 700° C.

12. A process according to claim 1 wherein said treated solid oxide compound is produced by a process comprising:
1) contacting said at least one solid oxide compound with a molybdenum-containing compound to produce a molybdenum-containing solid oxide compound; 2) calcining said molybdenum-containing solid oxide compound; and 3) contacting said molybdenum-containing solid oxide compound with said halogen to produce said treated solid oxide compound.

13. A process according to claim 12 wherein said molybdenum-containing solid oxide compound is calcined at a temperature in a range of about 200° C. to about 900° C. and a time in a range of about 1 minute to about 100 hours.

14. A process according to claim 13 wherein said molybdenum-containing solid oxide compound is calcined at a temperature in a range of about 350° C. to about 800° C. and a time in a range of about 1 hour to about 50 hours.

15. A process according to claim 14 wherein said molybdenum-containing solid oxide compound is calcined at a temperature in a range of 400° C. to 700° C. and a time in a range of 3 hour to 20 hours.

16. A process according to claim 1 wherein said treated solid oxide compound is produced by a process comprising: 1) contacting said at least one solid oxide compound with a molybdenum-containing compound; 2) calcining said molybdenum-containing compound while simultaneously contacting said molybdenum-containing compound with a halogen-containing compound to produce said treated solid oxide compound.

17. A process according to claim 16 wherein said molybdenum-containing solid oxide compound is calcined at a temperature in a range of 400° C. to 700° C. and a time in a range of 3 hour to 20 hours.

18. A process according to claim 1 wherein said organometal compound, said treated solid oxide compound, and said organoaluminum are combined by 1) contacting said organometal compound and said treated solid oxide compound for about 1 minute to about 24 hours at a temperature from about 10° C. to about 100° C. to form a first mixture; and 2) contacting said first mixture with said organoaluminum compound to form said catalyst composition.

19. A process according to claim 18 wherein said organometal compound, said treated solid oxide compound, and said organoaluminum are combined by 1) contacting said organometal compound and said treated solid oxide compound for 1 minute to 1 hour at a temperature from 15° C. to 50° C. to form a first mixture; and 2) contacting said first mixture with said organoaluminum compound to form said catalyst composition.

20. A process according to claim 1 wherein said organometal compound, said organoaluminum compound, and said treated solid oxide compound are precontacted for 1 minute to 1 hour at a temperature in a range of 20° C. to 80° C.

21. A process according to claim 1 wherein said molybdenum is provided by a molybdenum-containing compound selected from the group consisting of sodium metamolybdate, molybdic acid, molybdenum hexacarbonyl, molybdenum pentachloride, molybdenum dioxide, molybdenum trioxide, and mixtures thereof.

22. A process according to claim 1 consisting essentially of contacting said organometal compound, said treated solid oxide compound, and said organoaluminum compound to produce said catalyst composition.

23. A process according to claim 22 wherein said treated solid oxide compound is produced by a process comprising: 1) contacting said at least one solid oxide compound with a molybdenum-containing compound to produce a molybdenum-containing solid oxide compound; 2) calcining said molybdenum-containing solid oxide compound; and 3) contacting said molybdenum-containing solid oxide compound with said halogen to produce said treated solid oxide compound.

24. A process according to claim 23 wherein said molybdenum-containing solid oxide compound is calcined at a temperature in a range of 400° C. to 700° C. and a time in a range of 3 hour to 20 hours.

25. A process according to claim 22 wherein said organometal compound, said treated solid oxide compound, and said organoaluminum are combined by 1) contacting said organometal compound and said treated solid oxide compound for 1 minute to 1 hour at a temperature from 15° C. to 50° C. to form a first mixture; and 2) contacting said first mixture with said organoaluminum compound to form said catalyst composition.

26. A process according to claim 22 wherein said organometal compound, said organoaluminum compound, and said treated solid oxide compound are precontacted for 1 minute to 1 hour at a temperature in a range of 20° C. to 80° C.

27. A catalyst composition according to claim 4 wherein the amount of molybdenum present ranges from about 0.5 to about 5.0 millimoles per gram of solid oxide compound before calcining.

28. A catalyst composition according to claim 27 wherein the amount of molybdenum present ranges from about 0.5 to about 2.0 millimoles per gram of solid oxide compound before calcining.

29. A catalyst composition according to claim 4 wherein the amount of halogen present ranges from about 3% to about 25% by weight based on the weight of said treated solid oxide compound before calcining.

30. A catalyst composition according to claim 28 wherein the amount of halogen present ranges from 4% to 20% by weight based on the weight of said treated solid oxide compound before calcining.

31. A catalyst composition according to claim 4 wherein said treated solid oxide compound contains from 0.5 to 2.0 millimoles of molybdenum per gram of solid oxide compound before calcining, 4% to 20% by weight chloride based on the weight of said treated solid oxide compound before calcining.

32. A catalyst composition according to claim 4 wherein said organometal compound is selected from the group consisting of bis(cyclopentadienyl)hafnium dichloride, bis(cyclopentadienyl)zirconium dichloride, 1,2-ethanediylbis($\eta^5$-1-indenyl)di-n-butoxyhafnium, 1,2-ethanediylbis($\eta^5$-1-indenyl)dimethylzirconium, 3,3-pentanediylbis($\eta^5$-4,5,6,7-tetrahydro-1-indenyl)hafnium dichloride, methylphenylsilylbis($\eta^5$-4,5,6,7-tetrahydro-1-indenyl) zirconium dichloride, bis(n-butylcyclopentadienyl)di-t-butylamido hafnium, bis(n-butylcyclopentadienyl) zirconium dichloride; dimethylsilylbis(1-indenyl) zirconium dichloride, nonyl(phenyl)silylbis(1-indenyl) hafnium dichloride, dimethylsilylbis($\eta^5$-4,5,6,7-tetrahydro-1-indenyl)zirconium dichloride, dimethylsilylbis(2-methyl-1-indenyl)zirconium dichloride, 1,2-ethanediylbis(9-fluorenyl)zirconium dichloride, indenyl diethoxy titanium (IV) chloride, (isopropylamidodimethylsilyl) cyclopentadienyltitanium dichloride, bis(pentamethylcyclopentadienyl)zirconium dichloride, bis(indenyl)zirconium dichloride, methyloctylsilyl bis(9-fluorenyl) zirconium dichloride, bis-[1-(N,N-diisopropylamino)boratabenzene]hydridozirconium trifluoromethylsulfonate.

33. A catalyst composition produced by the process of claim 2.

34. A catalyst composition produced by the process of claim 3.

35. A catalyst composition produced by the process of claim 22.

* * * * *